Dec. 22, 1942.        J. A. RIOUX        2,306,083
SCRAPER
Filed May 1, 1940
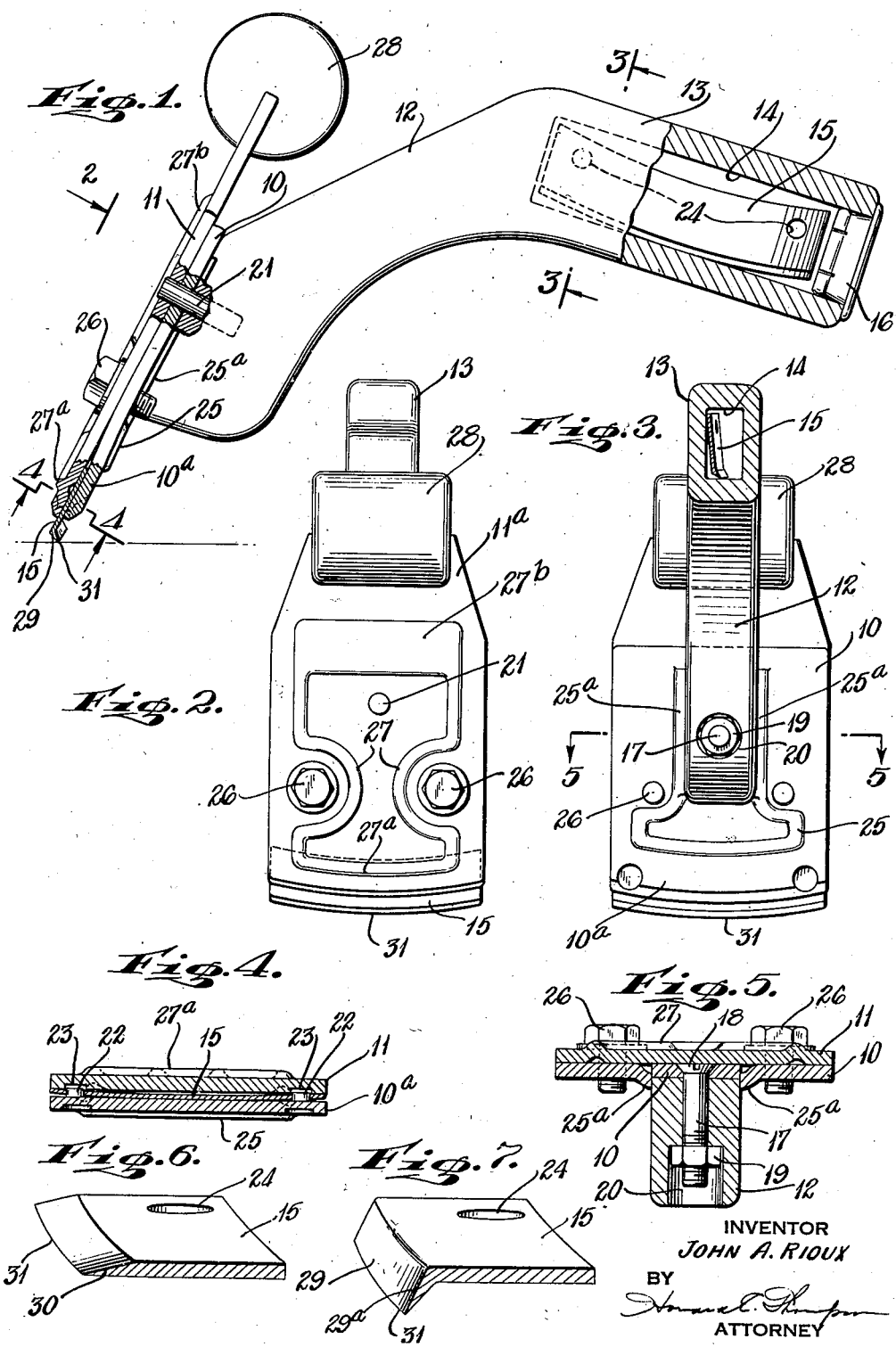
INVENTOR
JOHN A. RIOUX
BY
ATTORNEY Patented Dec. 22, 1942

2,306,083

UNITED STATES PATENT OFFICE 2,306,083

SCRAPER

John A. Rioux, St. Albans, N. Y., assignor of one-half to Edmund Marcotte, Jamaica, N. Y.

Application May 1, 1940, Serial No. 332,640

5 Claims. (Cl. 30—169)

This invention relates to scraper devices for use in removing finishes from floors or other painted surfaces, or as a tool for scraping or otherwise trimming a surface for any purpose; and the object of the invention is to provide a device of the character described comprising two blade supporting plates with means at outer or lower end portions of the plates for detachably supporting and keying a scraper blade in connection therewith; a further object being to provide a means for reinforcing both of said plates, including means for coupling the plates together for clamping a blade therebetween; a further object being to provide two handle portions, one supported on each plate, one of said handle portions also including means for keying its associated plate against swinging movement thereon and further including means for keying both plates against movement independent of the coupling or clamping means employed between said plates; a further object being to provide one of the handle members with a socket for receiving and supporting extra blades; a still further object being to provide a novel blade construction as well as method of producing the blade; and with these and other objects in view, the invention consists in a device of the class and for the purpose specified, and in a method of constructing blades as more fully hereinafter described and claimed.

The invention is fully disclosed in the following specification, of which the accompanying drawing forms a part, in which the separate parts of my improvement are designated by suitable reference characters in each of the views, and in which:

Fig. 1 is a side view of a scraper made according to my invention with parts of the construction broken away and in section.

Fig. 2 is a view looking in the direction of the arrow 2 of Fig. 1.

Fig. 3 is a sectional view substantially on the line 3—3 of Fig. 1.

Fig. 4 is a section on the line 4—4 of Fig. 1 showing only the front portion of the device.

Fig. 5 is a section on the line 5—5 of Fig. 3.

Fig. 6 is a perspective and sectional view of the blade showing the first step in forming the same; and Fig. 7 is a view similar to Fig. 6 showing the completed blade.

For the purpose of illustrating one adaptation of my invention, I have shown two substantially rectangular plates 10 and 11. For purposes of description, the plate 10 will be termed the inner plate and the plate 11 the outer plate. Secured to the plate 10 is a large offset handle member 12 having a pistol grip hand portion 13 provided with an elongated chamber 14 for the storage of scraper blades 15. The chamber 14 opens through the end of the portion 13, and this opening is closed by a snap cover 16 sufficient to retain one or more blades 15 against accidental displacement. One of the blades 15 is shown supported between the plates 10 and 11 in the several figures.

The plate 10 is secured to the handle 12 by a bolt 17, the head 18 of which is countersunk in the plate 10, and the nut 19 of the bolt is arranged within a recess 20 formed in the handle 12. A pin 21 also has a drive fit in the handle 12, and this pin extends through apertures in both plates 10 and 11 to provide a means of keying the plates 10 and 11 one with respect to the other. The plate 10 has its outer or lower end portion 10a offset with respect to the plate 11 to receive the scraper blade 15. From this offset portion the key members 22 are extruded to project from the upper surface of the part 10a of the plate 10 to enter corresponding recesses 23 formed on the inner surface of the plate 11 and to pass through apertures 24 formed in the blades 15 in keying a blade against shifting movement when clamped between the plates 10 and 11. The key members 22 are preferably disposed adjacent the ends of the blade 15 in order to firmly support the terminal ends or outer corners of the blade against stresses or strains to which they are subjected in the operation of the tool.

The plate 10 is reinforced by a downwardly pressed reinforcing rib 25 of the general contour seen in Fig. 3 of the drawing. The portions 25a of this rib which parallel the sides of the handle 12 where it rests upon the back of the plate 10, are cut through the plate sufficiently to form straight supporting shoulders as clearly seen in Fig. 5 of the drawing, which also keys the handle 12 against shifting movement on the plate 10. This eliminates any tendency of loosening the bolt 17 and also reinforces and strengthens the plate mountings upon the handle as will be apparent.

The plate 10 is also provided with spaced threaded apertures for receiving clamp screws 26 which also pass through apertures in the plate 11. The heads of the screws are disposed in the outer surface of the plate 11 within arc-shaped reinforcing rib portions 27 pressed outwardly on the plate 11. These rib portions 27 are joined at the lower end of the plate in a cross member 27a and near the upper end of the plate in a large cross member 27b which may form a name plate if desired.

The plate 11 has an extension 11a beyond the upper end of the plate 10. This extension is reduced in width, and supported thereon is a cylindrical handle member 28 which may be engaged by the other hand of the operator in bearing down upon the tool in the operation thereof. The lower ends of both plates 10 and 11 are curved as clearly seen in Figs. 2 and 3 to conform with the curvature of the scraper edge 29 of the blade. It will also appear upon a consideration of Fig. 1 of the drawing that the lower end of the plate 11 protrudes beyond the corresponding end of the plate 10, thus providing a firm support of the blade 15 adjacent its edge 29 and also a sufficient recess rearwardly of the blade 15 for receiving the shavings or other trimmings in a scraping operation.

In producing the blade 15, a blank is first stamped from a hard steel, preferably having the characteristics of maintaining in the resulting blade scraper edge 29, a sharpened edge and yet an edge which can be re-sharpened by a file or similar tool moved across the outer surface 29a of the edge 29. The flat blank is first ground to form a long bevel as at 30, Fig. 6 of the drawing, and also shaped to form a rounded sharpened edge 31. Thereafter the blank as formed in Fig. 6 is bent to offset the beveled portion 30 in the manner clearly seen in Fig. 7. This extends the blade edge 29 substantially at right angles to the plane of the blade, the edge 29 being flared outwardly to a slight extent.

It is also preferred that the blade 15 be bowed inwardly in a longitudinal direction and toward the edge 29; or in other words, toward the surface of the blade 15 from which the edge 29 protrudes. It will thus be seen that the apertured end portions of the blade 15 will contact the lower surface of the plate 11, and the central portion of the blade 15 will contact the upper surface of the plate 10 as clearly seen in Fig. 4 of the drawing. Thus, as the plates 10 and 11 are clamped together, the blade 15 is flexed slightly or in other words, is put under a tension which firmly maintains the blade in operative position. This flexure or bowing of the blade also rounds the cutter edge 31 so that the central portion of this edge protrudes closer to the work than does the outer corner portions.

Considering the cutter edge 31, it may be said that this edge is bowed or curved in two directions; that is to say, the curvature which conforms with the outer contour of the blade 15 and the other curvature which presents the central portion of the edge lower than the extreme ends of said edge. It will be apparent from a consideration of Fig. 7 of the drawing that it is the beveled or ground portion 30 only of the blade that is turned or bent to form the flange portion 29, otherwise termed the edge of the blade.

In blades of the type and kind under consideration, it has been a common practice to use very hard materials in the effort of producing scraper edges which would give long life in service. However, in most of such instances, the material has been of such structure as to make it substantially impossible to sharpen the scraper edge by the use of conventional means. It is my intention to use a steel which will give long service in any sharpening, but also in providing a steel which can be easily re-sharpened by the use of a fine file or other instrument moved over the surface 29a, thus maintaining long life and service for the blade. The blade edge or flange portion 29 is of sufficient width to provide many sharpening operations before this edge or flange portion is wholly consumed. In fact, the blade can be ground down to a point where no flange portion at all exists.

Having fully described my invention, what I claim as new and desire to secure by Letters Patent, is:

1. In a scraper of the class described, a blade supporting body comprising substantially rectangular plates, means for coupling said plates to clamp a blade between free end portions thereof, a large offset handle member arranged upon the inner surface of one plate, means for securing and keying the handle to said plate to prevent relative movement of the plate and handle, the other of said plates extending upwardly beyond the first mentioned plate and having a hand grip portion forming another handle for the tool, the blade supporting end portions of said plates having means on adjacent surfaces thereof for keying a scraper blade within and between said plates, both plates having reinforcing ribs arranged upon the central portions thereof, and part of the ribs of the first mentioned plate forming part of the means keying and retaining the handle of said plate against movement thereon.

2. In a scraper of the class described, a blade supporting body comprising substantially rectangular plates, means for coupling said plates to clamp a narrow transverse blade between free end portions thereof, a large offset handle member arranged upon the inner surface of one plate, means for securing the handle to said plate, reinforcing means on the first named plate engaging the side walls of the handle to retain the handle against transverse movement on said plate, the other of said plates extending upwardly beyond the first mentioned plate and having a hand grip portion forming another handle for the tool, the blade supporting end portions of said plates having means on adjacent surfaces thereof adapted to cooperate with opposed end portions of a blade for keying a scraper within and between said plates.

3. A scraper of the class described comprising a blade supporting body, said body being formed from two relatively movable plates arranged one upon the other, each plate having at one end portion thereof an extending handle, means between adjacent surfaces of the other end portion of the plates for keying a narrow transverse blade between said plates, both of said plates having reinforcing ribs on central portions thereof, the lower free edge of the last named end portion of both plates having a rounded arc-shaped contour, said edge of one of the plates protruding beyond the corresponding edge of the other plate, and part of the ribs of one plate retaining the handle member of said plate against movement thereon.

4. A scraper of the class described comprising a body having inner and outer plates, means clamping said plates together to retain a blade between adjacent surfaces of the lower end portions thereof, means on said plates adjacent lower corner portions thereof for keying the blades against movement relatively thereto, a handle member coupled with the inner plate and including a hand grip portion extending angularly with respect to said plate, and reinforcing means spaced transversely of the inner plate and engaging opposed side walls of said handle member to retain the handle member against transverse movement on said inner plate.

5. A scraper of the class described comprising a body having inner and outer plates, means clamping said plates together to retain a blade between adjacent surfaces of the lower end portions thereof, means on said plates adjacent lower corner portions thereof for keying the blades against movement relatively thereto, a handle member coupled with the inner plate and including a hand grip portion extending angularly with respect to said plate, and reinforcing means spaced transversely of the inner plate engaging opposed side walls of said handle member to retain the handle member against transverse movement on said inner plate, and other means keying both of said plates to said handle member.

JOHN A. RIOUX.